United States Patent
Fox

(10) Patent No.: US 11,274,997 B2
(45) Date of Patent: Mar. 15, 2022

(54) CYTOLOGICAL STAINING COMPOSITIONS AND USES THEREOF

(71) Applicant: TriPath Imaging, Inc., Burlington, NC (US)

(72) Inventor: William Alan Fox, Lake Wylie, SC (US)

(73) Assignee: TriPath Imaging, Inc., Burlington, NC (US)

( * ) Notice: Subject to any disclaimer, the term of this patent is extended or adjusted under 35 U.S.C. 154(b) by 1130 days.

(21) Appl. No.: 14/765,709

(22) PCT Filed: Feb. 4, 2014

(86) PCT No.: PCT/US2014/014563
§ 371 (c)(1),
(2) Date: Aug. 4, 2015

(87) PCT Pub. No.: WO2014/123844
PCT Pub. Date: Aug. 14, 2014

(65) Prior Publication Data
US 2015/0369708 A1 Dec. 24, 2015

Related U.S. Application Data

(60) Provisional application No. 61/760,889, filed on Feb. 5, 2013.

(51) Int. Cl.
*G01N 1/30* (2006.01)
(52) U.S. Cl.
CPC ......... *G01N 1/30* (2013.01); *G01N 2001/302* (2013.01)
(58) Field of Classification Search
CPC ...................................... G01N 1/30
See application file for complete search history.

(56) References Cited

U.S. PATENT DOCUMENTS 3,776,630 A * 12/1973 Ohno ................. G03G 9/18
399/237
4,392,864 A 7/1983 Helfrich et al.
(Continued)

FOREIGN PATENT DOCUMENTS

CN 1256317 A 6/2000
CN 1349633 A 5/2002
(Continued)

OTHER PUBLICATIONS

Britos et al. Biochemistry and Molecular Biology Educationvol. 32, No. 5, pp. 341-347, 2004.*
(Continued)

*Primary Examiner* — Erin M. Bowers
(74) *Attorney, Agent, or Firm* — Sheppard, Mullin, Richter & Hampton LLP

(57) ABSTRACT

The present subject matter is directed to a composition for staining cytological material comprising a cationic dye component, a hygroscopic polyol and optionally a water-soluble solvent, water or water-miscible solvent, methods of use of the compositions. Advantageously, the present compositions do not require the use of a cover slide as is required in known staining fixatives. The compositions are able to retain cell morphology for a period of time such that a cover slide is not required. Further, the compositions do not contain hazardous levels of organic components. Preferably, the compositions consist essentially of Azure C, glycerol and optionally water. In another aspect, the present subject matter is directed to a method of characterizing a cell sample comprising contacting the cell sample with a composition comprising a dye component and a hygroscopic polyol and subjecting the sample to analysis to determine the presence or absence of abnormal cells.

32 Claims, 8 Drawing Sheets

(56) References Cited

U.S. PATENT DOCUMENTS

| | | | |
|---|---|---|---|
| 4,595,524 A | 6/1986 | Yip et al. | |
| 4,741,898 A | 5/1988 | Mallik et al. | |
| 2007/0020664 A1* | 1/2007 | Gupta | C12Q 1/6823 435/6.12 |
| 2007/0172911 A1 | 7/2007 | Farrell et al. | |
| 2007/0253909 A1* | 11/2007 | Magallon | A61K 31/135 424/9.6 |
| 2011/0190728 A1* | 8/2011 | Lingenfelder | A61P 41/00 604/521 |
| 2012/0322099 A1 | 12/2012 | Lapen et al. | |

FOREIGN PATENT DOCUMENTS

| | | |
|---|---|---|
| CN | 102256627 A | 11/2011 |
| WO | 2006034385 A1 | 3/2006 |
| WO | 2012/064873 A1 | 5/2012 |

OTHER PUBLICATIONS

Britos et al., Biochem. Mol. Biol. Education 32(5): 341-347 (2004).*

English translation of search report from CN201480019604.9 Office action dated Dec. 30, 2016, 3 pages.

Li Shunyi et al., "Application of Textile Dyes in Morphology Detection for Blood Cells," Chinese Journal of Laboratory Medicine, vol. 28, No. 9, Sep. 30, 2005, 7 pages, English translation.

Extended European Search Report for EP 14749671, dated Oct. 18, 2016, 7 pages.

International Search Report for Application No. PCT/US14/14563 dated Apr. 23, 2014.

Examination Report dated Mar. 13, 2018 in European Patent Application No. 14749671.5.

Office Action dated Jul. 25, 2017 in Chinese Patent Application No. 201480019604.

Office Action dated Feb. 13, 2018 in Chinese Patent Application No. 201480019604.

Office Action dated Jun. 21, 2018 in Chinese Patent Application No. 201480019604.

Office Action dated Oct. 22, 2018 in Chinese Patent Application No. 201480019604.

Notice of Allowance dated Feb. 12, 2018 in Chinese Patent Application No. 201480019604.

Second Examination Report issued by European Patent Office in corresponding EP Patent Application No. 14749671.5 dated Apr. 22, 2021, 4 pp.

* cited by examiner

```
┌─────────────────────────────────────────┐
│       Cytology Preparation Processes    │
└─────────────────────────────────────────┘
                    ↓
┌─────────────────────────────────────────┐
│ Sample is pre-processed to remove unwanted materials │
│ and concentrate the cells.              │
│ (i.e.: Centrifugation, Filter Adhesion, etc...) │
└─────────────────────────────────────────┘
                    ↓
┌─────────────────────────────────────────┐
│ Cells are deposited onto a charged microscope slide. │
└─────────────────────────────────────────┘
                    ↓
┌─────────────────────────────────────────┐
│ Use Composition Stain to remove excess cells from slide │
└─────────────────────────────────────────┘
                    ↓
┌─────────────────────────────────────────┐
│ Incubate Composition Stain on slide (about 60 secs.) │
└─────────────────────────────────────────┘
                    ↓
┌─────────────────────────────────────────┐
│ Remove excess stain from slide          │
└─────────────────────────────────────────┘
                    ↓
┌─────────────────────────────────────────┐
│ Optionally add a liquid cover slip (25μl) │
└─────────────────────────────────────────┘
                    ↓
┌─────────────────────────────────────────┐
│ Slide is ready for cytological evaluation. │
└─────────────────────────────────────────┘
                    ↓
     ╱─────────────────────────────────────╲
    ╱  If additional staining or alternate processing is ╲
   ╱  required after the initial evaluation of the processed ╲
  ╱    slide, the technician simply has to rinse the slide in ╲
  ╲     Deionized Water and proceed directly to the          ╱
   ╲    subsequent process. Cellular morphology and         ╱
    ╲      architecture of the sample will have been       ╱
     ╲                  preserved.                        ╱
      ╲─────────────────────────────────────────────────╱
```

FIGURE 2

CYTOLOGICAL STAINING COMPOSITIONS AND USES THEREOF

CROSS-REFERENCE TO RELATED APPLICATIONS

The present application is a national phase entry under 35 U.S.C. § 371 of International Application No. PCT/US2014/014563, filed on Feb. 4, 2014, published in English, which claims priority from U.S. Provisional Patent Application No. 61/760,889 filed Feb. 5, 2013, all of which are incorporated herein by reference.

FIELD OF THE INVENTION

The subject matter disclosed herein relates generally to compositions and methods of preparing cytological samples that preserve cell morphology to detect abnormal cells.

BACKGROUND

Cytology is the branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "Pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies, whereby a tissue specimen is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body fluids from the chest cavity, bladder, spinal canal, or other appropriate area. The cell samples are placed in solution and subsequently collected and transferred to a glass slide for viewing under magnification. Fixative and staining solutions are typically applied to the cells on the glass slide, often called a cell smear, for facilitating examination and for preserving the specimen for archival purposes.

Traditional staining solutions can be alcohol-based or contain significant levels of hazardous materials, such as formaldehyde. A traditional multicolored stain is desirable for staining cell smears for certain cytological analyses. It is advantageous to stain the nucleus and the cytoplasm of the specimen with different colors, so that the nuclear material and cytoplasmic material can be readily distinguished either visually or by automated imaging equipment. In one staining practice, the cytoplasm is transparent, whereas the nucleus is transparent to opaque. This staining pattern allows the cytologist to distinguish cells which are morphologically abnormal indicated, for example, by nuclear material which is excessively large and/or dark in color. In addition, cytologists find the variety of colors of the traditional stains, particularly the Papanicolaou stain, helpful to reduce eye strain and to aid diagnosis.

However, traditional stains, including the Papanicolaou stain, are difficult for an automated system to analyze. The variety of colors in the cytoplasm from traditional stains, which are straightforward for the human eye to distinguish, are not readily analyzed with automated imaging systems because they contrast to varying degrees with the traditional blue hematoxylin stain of the nucleus. The varying contrast makes automated analysis unreliable. Many diagnostic assays depend on the evaluation of cytological and histological components. One requirement of these evaluations is the adhesion of these components to a solid substrate, such as a glass or plastic microscope slide. Once immobilized by adhesion, these components may be processed further to gain diagnostic information.

Several cytological/histological adhesion reagents have been developed. Although effective, adhesive reagents to some degree lose their adhesive properties and do not remain stable once coated, applied, and dried on a solid substrate. This results in the need to prepare freshly coated slides for optimal routine use.

What is therefore needed is a cytological staining composition that provides a high contrast between the nucleus and the cytoplasm of a cell but does not require freshly coated slides for optimal performance. It is evident that there is an unmet need for cytological staining compositions that would be considered non-hazardous material, are water-soluble and can be used in a one-step cytological preparation protocol.

BRIEF SUMMARY

In one aspect, the present subject matter is directed to a composition for staining cytological material comprising: i. a dye component consisting essentially of one or more water-soluble, pH neutral, cationic dyes, ii. a hygroscopic polyol that is present in an amount less than about 10% v/v of the total composition, and optionally iii. a water-soluble solvent, water or a water-miscible solvent.

In one aspect, the present subject matter is directed to a composition for staining cytological material comprising: i. a dye component consisting essentially of one or more water-soluble, pH neutral, anionic dyes, ii. a hygroscopic polyol that is present in an amount less than about 10% v/v of the total composition, and optionally iii. a water-soluble solvent, water or a water-miscible solvent.

In another aspect, the present subject matter is directed to a method of preparing a cytological preparation comprising contacting a cell sample with a composition comprising: i. a dye component consisting essentially of one or more water-soluble, pH neutral, cationic dyes, ii. a hygroscopic polyol that is present in an amount less than about 10% v/v of the total composition, and optionally iii. a water-soluble solvent, water or a water-miscible solvent.

In another aspect, the present subject matter is directed to a method of analyzing a cell sample comprising, a) contacting the cell sample with a composition comprising: i. a dye component consisting essentially of one or more water-soluble, pH neutral, cationic dyes; ii. a hygroscopic polyol that is present in an amount less than about 10% v/v of the total composition, and optionally iii. a water-soluble solvent, water or a water-miscible solvent; and b) subjecting the sample to an analysis or evaluation.

BRIEF DESCRIPTION OF THE DRAWINGS

The present invention will be better understood and features, aspects and advantages other than those set forth above will become apparent when consideration is given to the following detailed description thereof. Such detailed description makes reference to the following drawings, wherein:

FIG. 2 is a flow chart for a process of staining a cytological sample using a cytological staining composition disclosed herein and a substrate having a polycationic charge coating.

DETAILED DESCRIPTION

Figure 1:
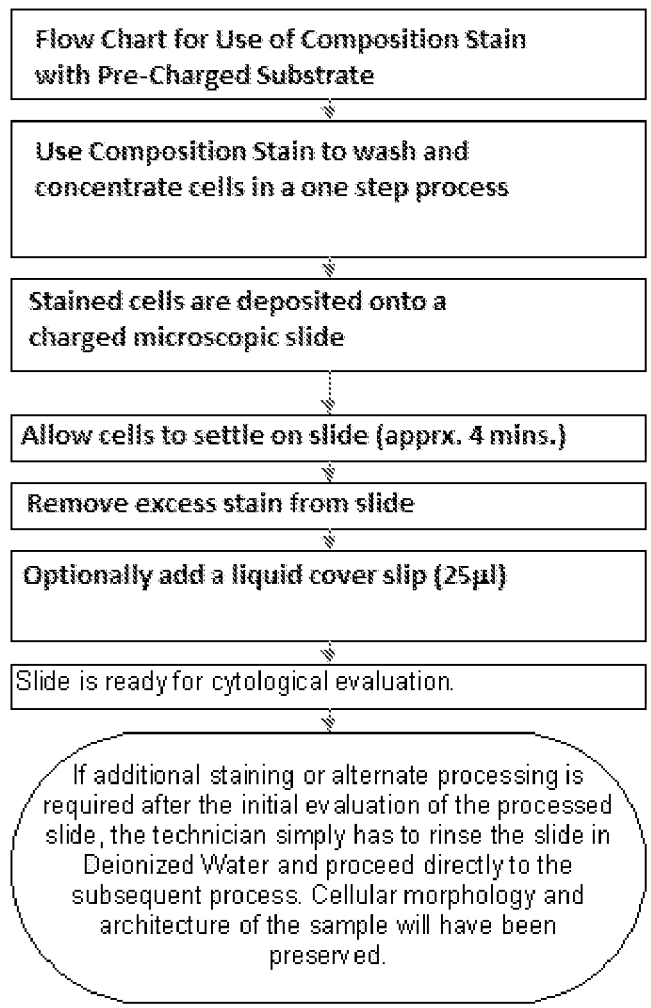
FIG. 1 is a flow chart for a one-step process of staining a cytological sample using a cytological staining composition disclosed herein and a substrate having a polycationic charge coating.

The subject matter disclosed herein is directed to compositions for staining cytological material and the methods of their use. The compositions provide excellent contrast of the cellular components including the nucleus and related structures relative to the cytoplasm and its related structures. Additional advantageous aspects of the present invention are that the compositions are pH neutral, i.e., not corrosive, are aqueous-based, i.e., not flammable and can be used in a one-step system for characterizing cytological material. Because the compositions can provide superior contrast, they are suitable for use in a convenient one-step system for characterizing cytological material. In this aspect, the compositions do not require equipment that is complicated, expensive and often inaccessible. Too often, the need for such equipment results in the foregoing of cytological screenings. Consequently, screenings are not performed and an opportunity for early diagnosis is missed. Accordingly, the compositions described herein not only can offer superior contrast but also advantageously provide almost unlimited access to cytology screening.

Advantageously, the present compositions do not require the use of a standard cover slide as is required in known staining fixatives. The compositions are able to retain cell morphology for a period of time such that a standard cover slide is not required. Further, the compositions do not contain hazardous levels of organic solvents or other components that are not biocompatible. Preferably, the compositions consist essentially of Azure C, glycerol and optionally water. In another aspect, the present subject matter is directed to a method of characterizing a cell sample comprising contacting the cell sample with a composition described herein and subjecting the sample to analysis to determine the presence or absence of abnormal cells.

As used herein, the term "water-soluble, pH neutral, cationic dye" is intended to mean a compound or biologic that is a dye or stain useful for staining cells or cell components whereby the dye or stain has the following properties: The dye or stain is preferably readily soluble at useful concentrations in water at 20° C. and at the final pH of the composition; the dye or stain is pH neutral, which means that when dissolved in an aqueous solution, the dye or stain does not alter the pH of the solution to a significant degree. In other words, the final pH of the solution is from about 6-8; and the dye or stain is cationic, which means that the dye or stain is capable of ionizing to a cationic ion in an aqueous solution. Preferably, the stain used in this process is from a class of "basic ionized" stains and contains positively charged functional groups. These charges do not compete for the negative binding sites on the positively charged slide surface. Therefore, cells stained with these types of stains bind readily and strongly adhere to the positively charged slides. As these stains are aqueous based and are used at a relatively neutral pH of 6.0-8.0, they would not be considered corrosive. They are also non-flammable.

As used herein, the term "water-soluble, pH neutral, anionic dye" is intended to mean a compound or biologic that is a dye or stain useful for staining cells or cell components whereby the dye or stain has the following properties: The dye or stain is preferably readily soluble (e.g., 50 g/L) in water at 20° C. and at the final pH of the composition; the dye or stain is pH neutral, which means that when dissolved in an aqueous solution, the dye or stain does not alter the pH of the solution to a significant degree. In other words, the final pH of the solution is from about 6-8; and the dye or stain is anionic, which means that the dye or stain is capable of ionizing to an anionic ion in an aqueous solution.

As used herein, the term "hygroscopic" is intended to mean a property of a polyol to attract and hold water molecules from the surrounding environment. This can be achieved by absorption or adsorption. The polyol may physically change as it absorbs or adsorbs water, for example, by an increase in its volume, stickiness or ability to hydrate substances that the polyol is contacting.

As used herein, the term "polyol" is intended to encompass aliphatic diols and triols and derivatives thereof. Preferably, the polyol is a liquid.

The term "biocompatible" refers to solvents that do not induce excessive toxic or excessive unwanted effects on the cell samples when employed in useful amounts. These effects can include dehydration and destabilization of cytological architecture.

The term "organic solvent" refers to an organic compound with solvent properties or a mixture of organic compounds with solvent properties. Generally, in the field of the invention, organic solvents belong to various chemical classes such as hydrocarbons, ketones, alcohols, carboxylic acid esters, and the like. Preferably, the cytological staining solutions described herein are water-based and contain low, trace or zero amounts of organic solvents.

The term "water-soluble solvent" means a liquid that solvates the components of the composition, is substantially inert and will dissolve in water. This is intended to mean that the solvent does not affect pH or any other property of the composition and the solvent does not itself contain a dye prior to solvating the composition. A water-soluble solvent may also be an organic solvent. However, as disclosed herein, the final composition will contain a solvent system made up of water, water-soluble solvent(s) and/or water-miscible solvent(s) such that the composition is, unlike known compositions, biocompatible and non-flammable.

The term "miscible" refers to the ability of a liquid to mix evenly into another liquid.

As used herein, the term "hazardous material" or "hazardous level" refers to known regulatory standards for either use or exposure in humans; hazardous materials transport regulations and/or regulations for incineration or disposal.

As used herein, the term "non-flammable" is intended to mean a composition or solvent which is never ignited by an igniting source irrespective of its mixing ratio with air if its temperature is in a practical temperature range. In the above-described definitions, the practical temperature range is from −40° C. to +100° C. On the other hand, the term "inflammable" as used herein is intended to mean the composition or solvent which, upon touching an igniting source, is ignited if its temperature is in a practical temperature range, and its mixing ratio with air is a predetermined value. The term "abnormal cell" refers to any diseased or pathological cell. Abnormal cells demonstrate abnormal morphological characteristics when viewed microscopically. These abnormal morphological characteristics can be observed by employing the cytological staining compositions disclosed herein and simple light microscopy. Non-limiting examples of abnormal cells include pre-cancerous changes as well as true cancerous cells.

The subject matter described herein is a convenient process for the staining and temporary, i.e., hours, days and weeks, preservation of stained cytological samples such that the samples may be evaluated for risk stratification and subsequently processed with alternate staining or other processes. This process utilizes a water soluble stain reagent and a water soluble solvent, which may be an organic component, to preserve cytological morphology and architecture. Optimally, the process can incorporate pre-coated substrates. Additionally, the methods can further comprise contacting the cells that have been stained with a composition described herein with a subsequent staining solution, such as standard Papanicolaou stain. This overstaining process does not require de-staining steps prior to the use of the subsequent staining solution.

In an embodiment, the present subject matter is directed to a composition for cytology staining, comprising: i. a dye component consisting essentially of one or more water-soluble, pH neutral, cationic dyes; ii. a hygroscopic polyol; and optionally iii. a water-soluble solvent. In this embodiment, the dye component will not contain an anionic dye or a mixture of dyes that will interfere with the immobilization of the cell sample or delineation of cellular architecture.

Useful cationic dyes include crystal violet, acriflavine, bismarck brown, malachite green, methyl green, Victoria pure blue BO, and Azure C, and analogues thereof. Examples of cationic dyes include those listed in Table 1:

TABLE 1

| Cationic dyes | | | |
|---|---|---|---|
| Basic blue 8 | 42563 | Triarylmethane | Victoria blue 4R |
| Basic blue 9 | 52015 | Thiazin | Methylene blue |
| Basic blue 12 | 51180 | Oxazin | Nile blue A |
| Basic blue 15 | 44085 | Triarylmethane | Night blue |
| Basic blue 17 | 52040 | Thiazin | Toluidine blue O |
| Basic blue 20 | 42585 | Triarylmethane | Methyl green |
| Basic blue 26 | 44045 | Triarylmethane | Victoria blue B |
| Basic brown 1 | 21000 | Azo | Bismarck brown Y |
| Basic fuchsin | — | Triarylmethane | Basic fuchsin |
| Basic green 4 | 42000 | Triarylmethane | Malachite green |
| Basic green 5 | 52020 | Thiazin | Methylene green |
| Basic orange 14 | 46005 | Acridine | Acridine orange |
| Basic red 2 | 50240 | Safranin | Safranin O |
| Basic red 5 | 50040 | Eurhodin | Neutral red |
| Basic red 9 | 42500 | Triarylmethane | Pararosanilin |
| Basic violet 2 | 42520 | Triarylmethane | New fuchsin |
| Basic violet 3 | 42555 | Triarylmethane | Crystal violet |
| Basic violet 4 | 42600 | Triarylmethane | Ethyl violet |
| Basic violet 10 | 45170 | Rhodamine | Rhodamine B |
| Basic violet 14 | 42510 | Triarylmethane | Rosanilin |
| Basic yellow 1 | 49005 | Thiazole | Thioflavine T |
| Basic yellow 2 | 41000 | Diarylmethane | Auramine O |

A particularly useful dye is Azure C. Azure C has the following chemical structure:

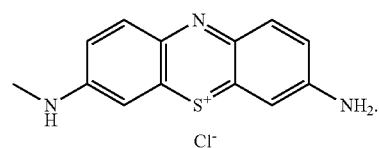 [SMILES: CNc1ccc2nc3ccc(N)cc3[s+]c2c1 ; [Cl-]]

In useful embodiments, the dye component consists essentially of a cationic dye. In these embodiments, the composition does not contain an anionic dye. In a preferred embodiment, the dye component consists of a single dye, such as Azure C. This means that the composition for cytology staining contains a single dye, though the composition can comprise other components and adjuvants that are not dyes.

Cationic dyes are preferred. In a preferred method employing the cytological staining compositions described herein, the cytological sample is associated with a substrate. Preferably, this substrate has a cationic coating. Such a coating provides a charge potential that binds biological samples of interest to the substrate. For example, a microscopic slide can have a coating that facilitates fixation of the sample to the slide. FIGS. 1 and 2 depict exemplary processes and FIGS. 3-8 depict cell staining on such substrates. An exemplary substrate of this kind is described in PCT/US2005/033938 (WO/2006/034385), herein incorporated by reference in its entirety. Protocols that employ poly-L lysine, poly-D lysine and silanol substrates are also contemplated.

Preferably, the cytological staining compositions described herein can be employed in a one-step cytological sample preparation protocol. In customary cytological staining solutions, the sample must first be immobilized on a substrate. Only then is it practical to stain the immobilized sample. In contrast, the cytological staining compositions described herein can advantageously be used in a solution that immobilizes the sample and concurrently stains the nuclear and/or cytoplasmic structures of the cells.

Anionic dyes can also be used in the cytological staining compositions described herein. However, because of the convenience and oftentimes necessity for a one-step, straightforward cytological preparation, the cationic dyes disclosed herein are preferred. Useful anionic dyes include those listed in Table 2 as well as homologues thereof:

TABLE 2

| Anionic dyes | | | |
|---|---|---|---|
| Acid black 1 | 20470 | Azo | Amido black 10B |
| Acid blue 22 | 42755 | Triarylmethane | Water blue |
| Acid blue 93 | 42780 | Triarylmethane | Methyl blue |
| Acid fuchsin | 42685 | Triarylmethane | Acid fuchsin |
| Acid green | 42095 | Triarylmethane | Light green SF yellowish |
| Acid green 1 | 10020 | Nitroso | Naphthol green B |
| Acid green 5 | 42095 | Triarylmethane | Light green SF yellowish |
| Acid magenta | 42685 | Triarylmethane | Acid fuchsin |
| Acid orange 10 | 16230 | Azo | Orange G |
| Acid red 4 | 14710 | Azo | Azo-eosin |
| Acid red 26 | 16150 | Azo | Xylidine ponceau |
| Acid red 29 | 16570 | Azo | Chromotrope 2R |
| Acid red 44 | 16250 | Azo | Ponceau 6R |
| Acid red 51 | 45430 | Fluorone | Erythrosin B |
| Acid red 52 | 45100 | Xanthene | Lissamine rhodamine B |
| Acid red 66 | 26905 | Azo | Biebrich scarlet |
| Acid red 73 | 27290 | Azo | Woodstain scarlet |
| Acid red 87 | 45380 | Fluorone | Eosin Y ws |
| Acid red 91 | 45400 | Fluorone | Eosin B |
| Acid red 92 | 45410 | Fluorone | Phloxine B |
| Acid red 94 | 45440 | Fluorone | Rose bengal |
| Acid red 101 | 50085 | Quinone-Imine | Azocarmine G |
| Acid red 103 | 50090 | Quinone-Imine | Azocarmine B |
| Acid roseine | 42685 | Triarylmethane | Acid fuchsin |
| Acid rubin | 42685 | Triarylmethane | Acid fuchsin |
| Acid violet 19 | 42685 | Triarylmethane | Acid fuchsin |
| Acid yellow 1 | 10316 | Nitro | Naphthol yellow S |
| Acid yellow 7 | 56205 | Ketonamine | Lissamine flavine FF |
| Acid yellow 9 | 13015 | Nitro | Fast yellow |
| Acid yellow 23 | 19140 | Azo | Tartrazine |
| Acid yellow 24 | 10315 | Nitro | Martius yellow |
| Acid yellow 36 | 13065 | Azo | Metanil yellow |
| Acid yellow 73 | 45350 | Fluorone | Fluorescein |
| Acid yellow 85 | — | Azo | Coomassie fast yellow G |
| Acid yellow S | 10316 | Nitro | Naphthol yellow S |
| Acid yellow T | 19140 | Azo | Tartrazine |

Further, if an anionic dye is used, then a cationic dye is excluded and vice versa.

Useful amounts of dye in the compositions are from about 0.01 to about 0.0001 w/v of the total composition. Preferably, the amount is from about 0.009 to about 0.001% w/v. More preferably, the amount is from about 0.005 to about 0.003% w/v. Most preferably, the amount is about 0.004% w/v.

Staining the target cells with the staining composition disclosed herein provides excellent morphological detail for identification of cells in a sample, for example abnormal cells. Other critical information useful for a more thorough diagnosis, such as the presence or absence of specific protein markers within the cell can also be obtained using the methods described herein. To ascertain such protein marker details from these abnormal cells, the presently described methods can incorporate known immunochemistry techniques. These techniques involve the application of specific antibodies designed to detect the protein markers of interest, along with some type of signaling entity to indicate that the antibody has indeed attached to the proteins of interest in the cells. These signaling entities can include, but are not limited to, conjugated dyes, fluorochromes, chemilluminescent reactants, and radioactive isotopes. In addition to providing rapid morphological detail of cytological samples, the compositions and methods disclosed herein allow for the target cells to be subsequently stained using such immuno-chemistry techniques as described above.

Useful hygroscopic polyols include glycerol, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol or 2,2,4-trimethyl-1,3-pentanediol, butylene glycol, pentaerthyritol, mannitol, sorbitol, di-glycerol, tri-glycerol, tetra-glycerol, erythritol, 2-hydroxymethyl-2-methyl-1,3-propanediol (trimethylolethane), 2-ethyl-2-(hydroxymethyl)-1,3-propanediol (trimethylolpropane), 1,2,4-hexanetriol and mixtures thereof. Preferably, the glycol is glycerol or sorbitol. Most preferably, at least one of the polyol(s) contained in the composition is glycerol. Most preferably, the only polyol contained in the composition is glycerol.

Useful amounts of polyol are less than about 10% w/w of the total composition, for example, 9%, 8%, 7%, 6%, 5%, 4%, 3%, 2% and 1% or less. Preferably, the amount of polyol present is less than about 5% w/v. Preferred compositions include polyol from about 0.001% to about 1.0% v/v. Most preferably, the amount of polyol present is about 0.05% w/v.

Useful solvents include water, water-soluble solvents and water-miscible solvents. Non-flammable solvents are those that can be used in concentrations that are below the flash point in the final composition. These include water and preferably simple alcohols. Most preferably, the solvent is water.

There exists a need for more efficient cytological sample preparation systems for improving the consistency, repeatability, and accuracy of sample preparation and analysis. In addition, manual intervention and/or manual processing in the sample preparation process may increase the likelihood that a sample will become contaminated. Any further analysis of such a contaminated sample may lead to an improper medical diagnosis. Manual intervention/manual processing may also increase the risk that the operator can become infected with any sample-borne virus or disease that may be present in the specimen. There exists a further need for more efficient cytological sample preparation systems that eliminate, reduce, or otherwise minimize, where possible, manual intervention and/or manual processing during sample preparation, such as, for example, through automation. Such a cytological sample preparation system should desirably be, for example, relatively easy to use and adaptable for processing a varying numbers of samples. The compositions and methods disclosed herein meet these needs.

In an embodiment, the subject matter disclosed herein is directed to methods of preparing a cytological preparation comprising: a) contacting a cell sample with a composition comprising: i. a dye component consisting essentially of one or more water-soluble, pH neutral, cationic dyes; ii. a hygroscopic polyol; and optionally iii. a water-soluble solvent. In this embodiment, the method can further comprise simultaneously contacting and immobilizing the cell sample onto a pre-coated substrate having a cationic coating as described elsewhere herein.

In an embodiment, the subject matter disclosed herein is directed to methods of preparing a cytological preparation comprising: a) contacting a cell sample with a composition comprising: i. a dye component consisting essentially of one or more water-soluble, pH neutral, anionic dyes; ii. a hygroscopic polyol; and optionally iii. a water-soluble solvent. In this embodiment, the cell sample has already been immobilized on a pre-coated substrate having a cationic coating as described elsewhere herein.

The cell sample is as described elsewhere herein. In useful embodiments, the cell sample is susceptible to containing abnormal cells of a subject.

In embodiments, the abnormal cell is a cancerous, pre-cancerous or atypical cell. Cells of the following types of cancers are of particular interest: a solid tumor, such as cervical or cancer of the reproductive system, brain, lung, liver, spleen, kidney (such as renal cell and renal pelvis), lymph node, small intestine, pancreas, blood cells, bone, colon/colorectal, stomach, breast, endometrium, prostate, testicle, ovary, central nervous system, skin, head and neck, esophagus, or bone marrow, or a hematological cancer, such as leukemia, acute promyelocytic leukemia, lymphoma, multiple myeloma, myelodysplasia, myeloproliferative disease, or refractory anemia. In particular, the cancer cell is cervical or an atypical cell associated with cervical cancers or disorders.

In embodiments, the cell sample is associated with a substrate. Useful substrates are selected from the group consisting of a microscope slide, a cuvette, a coverslip and a microtiter tray. Preferably, the substrate is a microscopic slide. In a preferred embodiment, the method does not comprise associating a standard cover slide with the sample that is associated with the substrate. A standard cover slip is a plastic, glass or other material that is transparent and can be hard or flexible. A standard cover slip does not include a liquid cover slip.

In an embodiment, the subject matter described herein is directed to a method of characterizing a cytological sample comprising: a) contacting a cell sample with a composition containing a cationic dye as disclosed herein, wherein the sample is simultaneously associated with a substrate, and b. subjecting said sample to an assay to determine the presence or absence of abnormal cells. In other embodiments, the subject matter described herein is directed to a method of characterizing a cytological sample comprising: a) contacting a cell sample with a composition disclosed herein, and b. subjecting said sample to an assay to determine the presence or absence of abnormal cells.

In these embodiments, the assay is any analyses or evaluation employed to determine the presence or absence of abnormal cells. These analyses are known in the art and can be automated or can be performed by a human such as a technician, cytologist or pathologist.

In an embodiment, the subject matter described herein is directed to a method of preparing a cytological sample comprising:
 a. Depositing cells onto a microscope slide, wherein said slide has a polycationic coating;
 b. Rinsing excess cells from the slide by contacting with Composition Stain;
 c. Allowing the Composition Stain to contact the slide for about 5 seconds, 30 seconds, 1 minute or longer;
 d. Removing excess Composition Stain from the slide; and
 e. Optionally, contacting the sample on the slide with a liquid cover slip or additional composition stain (about 25 µl).

The cytological preparation is ready for cytological evaluation. If additional staining or alternate processing is required after the initial evaluation of the processed slide, the technician simply has to rinse the slide in Deionized Water and proceed directly to the subsequent process. Cellular morphology and architecture of the sample will have been preserved.

In an embodiment, the subject matter described herein is directed to a method of preparing a cytological sample comprising:
 a. Utilizing Composition Stain to wash and concentrate cells;
 b. Depositing stained cells in Composition Stain onto a microscope slide, wherein said slide has a polycationic coating;
 c. Allowing cells to associate with the slide (typically 1 minute to 10 minutes);
 d. Remove excess Composition Stain from the slide; and
 e. Optionally, adding a Liquid Cover Slip or additional composition stain to slide (about 25 µl) and allowing it to spread over slide.

The cytological preparation is ready for cytological evaluation. If additional staining or alternate processing is required after the initial evaluation of the processed slide, the technician simply has to rinse the slide in Deionized Water and proceed directly to the subsequent process. Cellular morphology and architecture of the sample will have been preserved.

The cytological staining compositions described herein are able to prevent, mitigate or delay collapse of the cytological architecture of a cytological preparation. Cytological preparation refers to any sample containing biological materials, but in particular, refers to a sample containing cells. A disadvantage of known stains is that while they are capable of staining cells to varying degrees, they can contain high levels of alcohols or other solvents and components that facilitate collapse or degradation of cell morphology. While not being bound to any theory, it is believed that when the cell dehydrates, the structures within the cell compress and collapse. The cytological staining compositions described herein can stain the nucleus and cytoplasm with exceptional delineation of cell architecture and, unlike known compositions, they additionally prevent, mitigate or delay cell compression and collapse. As a result, components of the nucleus and cytoplasm of cells in a sample are prepared with excellent delineation. Additionally, it is not necessary to place a cover slip on the sample to help preserve or affix the sample.

In embodiments, the sample can be contacted with water to rehydrate any contents therein that have become dehydrated.

The figures disclosed elsewhere herein show the delineation of cellular architecture provided by the cytological staining compositions described herein. In addition to the benefits of being economical and not considered to be a hazardous material, the presently disclosed staining solutions perform better than the gold standard PAP stains.

While staining solutions are known, they are alcohol-based or contain hazardous components. The alcohol-based compositions contain much higher levels of alcohol than the presently described compositions. In all embodiments, the cytological staining compositions described herein cannot be described correctly as alcohol-based since the level of polyol(s) is less than 10%. Preferably, the remaining solvent component of the composition is made up of mostly or entirely of water. This provides the benefit of a non-flammable composition. Accordingly, the cytological staining compositions described herein are safer to handle and transport than traditional stains. Additionally, known compositions contain levels of fixatives such as formaldehyde. While formaldehyde is capable of fixing cells, it is also not biocompatible at useful levels. Often, solutions containing such levels of chemicals are classified as hazardous. This makes providing the staining solutions unnecessarily regulated and expensive in view of the cytological staining solutions disclosed herein. The cytological staining compositions disclosed herein overcome these problems.

Preferably, the methods described herein utilize a pre-coated substrate. The pre-coated substrate has a net positive (cationic) coating. This coating facilitates association of the sample to the substrate. When the composition contains only a cationic dye(s), the composition will not interfere with the function of the coating. Advantageously, the composition can be used concurrently during immobilization of the sample to the substrate.

Cells have a net negative charge on their outer surface. Glass slides used to immobilize cells for subsequent processing have been treated to provide a new positive charge on their surface. This charge difference between the cells and the treated slides creates the electrostatic adhesion to immobilize the cells on the slide surface. Most cytology staining techniques rely on "acid ionized" stains that contain negatively charged functional groups. As such, these stains can compete with the negative charged cell surfaces for binding sites on the positively charged glass slides. This results in very poor adhesion of cells to the slide surface when they have been stained in this manner. Many of these stains are also alcohol based and considered a hazardous material due to the corrosive qualities of the low pH (acid) and the flammability due to the high alcohol content.

The methods described herein are combinable with aspects of known cytology preparation processes to simplify the entire sample preparation process, save considerable time, and substantially increase processing throughput.

Figure 3:
FIG. 3 depicts abnormal cervical cells that were stained with the staining solution as described herein and subsequently immobilized onto a microscope slide having a polycationic charge coating. While the entirety of the cells and cell groups are readily visualized, the detail of the nucleus is extremely sharp in definition and can easily be distinguished for size, shape, and texture.
Figure 5:
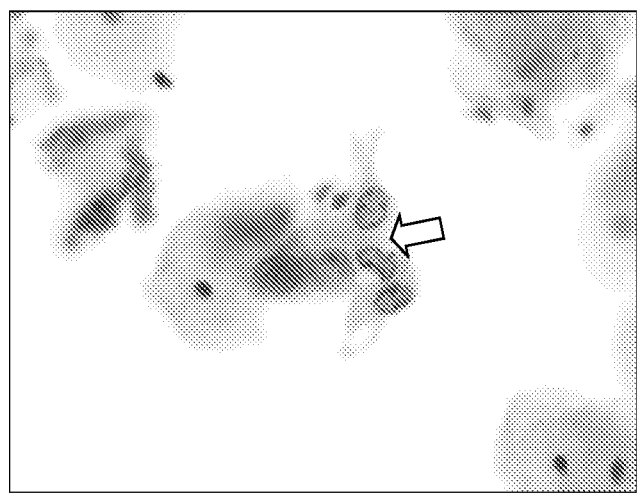
FIG. 5 depicts abnormal cervical cells that were stained with the staining solution as described herein and subsequently immobilized onto a microscope slide having a polycationic charge coating. While the entirety of the cells and cell groups are readily visualized, the detail of the nucleus is extremely sharp in definition and can easily be distinguished for size, shape, and texture.
Figure 7:
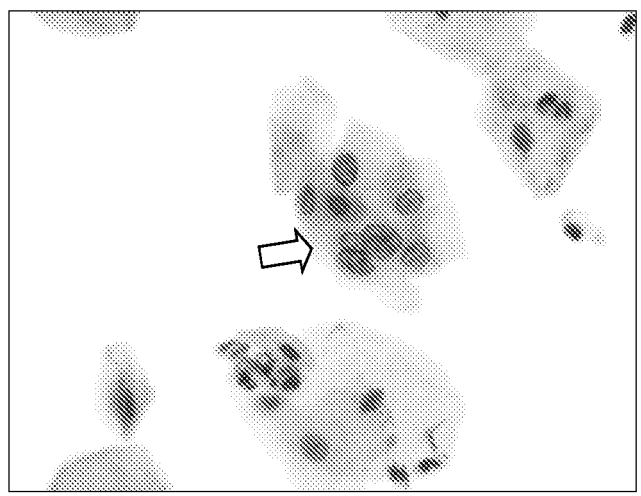
FIG. 7 depicts abnormal cervical cells that were stained with the staining solution as described herein and subsequently immobilized onto a microscope slide having a polycationic charge coating. While the entirety of the cells and cell groups are readily visualized, the detail of the nucleus is extremely sharp in definition and can easily be distinguished for size, shape, and texture.

Additionally, FIGS. 3, 5 and 7 show excellent nuclear details using a straightforward method with the stain solution as disclosed herein. The level of detail is optimal for analysis. While automated systems employing most other stains such as standard Papanicolaou stain require algorithms to attempt with some success to filter out chromagens, the use of the presently disclosed methods and stain solution provide a sample that is ready for immediate analysis. Thus, the use of the present stain solutions is not only simpler than art methods, the results provide superior morphology and detail as well as unmatched access to screening where the equipment needed in standard screening is not available.

Figure 4:
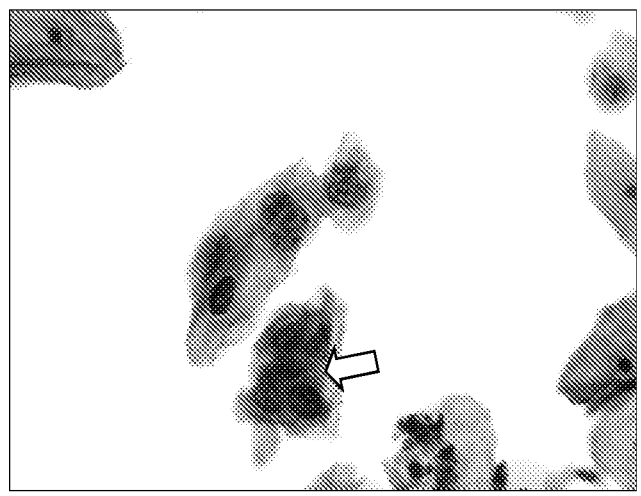
FIG. 4 depicts the same cells on the same slide in FIG. 3 that were originally stained with the staining solution. The sample can be subsequently restained with standard Papanicolaou stain. Note that the nuclear detail is less defined and more difficult to ascertain.
Figure 6:
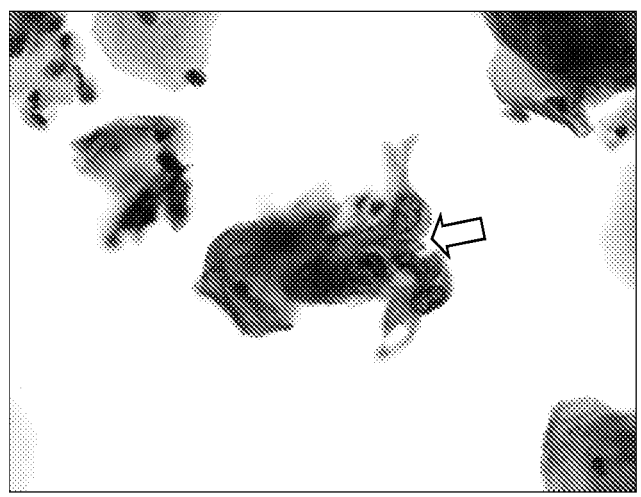
FIG. 6 depicts the same cells on the same slide in FIG. 3 that were originally stained with the staining solution and subsequently restained with standard Papanicolaou stain. Note that the nuclear detail is less defined and more difficult to ascertain.
Figure 8:
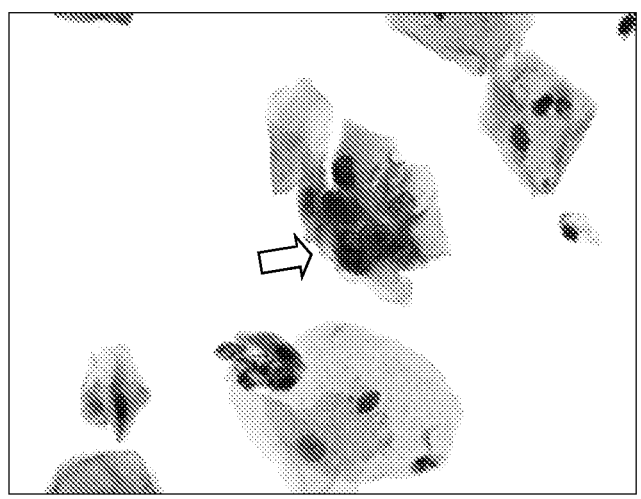
FIG. 8 depicts the same cells on the same slide in FIG. 3 that were originally stained with the staining solution and subsequently restained with standard Papanicolaou stain. Note that the nuclear detail is less defined and more difficult to ascertain.

Moreover, FIGS. 4, 6 and 8 show that the same sample can be overstained with a traditional stain should the use of a traditional stain be desired. This overstaining can be accomplished without first destaining the sample. Though surprisingly the presently disclosed stain solutions and methods provide exceptional cellular morphology and details, an advantage of these methods and stain solutions is that subsequent overstaining of the very same sample can be performed if desired. Overstaining of the very same sample entirely eliminates the high probability of not obtaining more of the same abnormal cells when analyzing a different sample from the same subject. The different sample may not contain abnormal cells at all since the abnormality may be rare, at an early stage or simply not observed among all the normal cells in the sample. Indeed, detecting abnormal cells early requires that relatively few abnormal cells present are observed. Accordingly, overstaining the same cell sample that has an observed abnormality eliminates the possibility that these abnormal cells detected initially are subsequently not observed in a sample that is subsequent or different from the original sample taken from the same subject.

Once the stained sample has been prepared, a small amount (20-50 ul) of a simple and benign solution is added to the cell deposition. This solution contains a percentage of glycerol in Deionized water and is also at a relatively neutral pH of 4.0-6.0. Though not tied to a particular theory, the hygroscopic nature of glycerol helps retain water within the cells which prevents morphology degradation and other drying artifacts which could negatively impact the evaluation. Surprisingly, the cell morphology is not affected by the cytological staining compositions disclosed herein, which have been shown to provide excellent delineation of cellular structure and retention of cellular morphology. By providing this osmotic and hydrostatic pressure balance, not only are the individual cells preserved but also the tertiary cytological architecture is maintained in such complex components as glandular cells or clusters.

Current cytological staining and evaluation processes utilize the following steps before the sample can be reviewed: Adhere the sample to a glass slide or other substrate; Stain the sample, often with alcohol based stains; Remove excess stains from the slide with alcohol; Remove residual water and alcohols with a clearing agent, such as xylene; Applying a mounting media and cover-slip to the slide and allowing it to dry. While effective, the art processes require that the sample first be adhered to a glass slide prior to staining. Also, the majority of cytological staining procedures require multiple stains of separate aqueous and organic base solvents. This requires special handling and requires multiple containers and rinse steps to transition between the different stains. If additional staining or alternate processing is required after the initial evaluation of the processed slide, the technician would either need to prepare another sample or remove the cover-slip and try and reprocess the original slide sample.

In summary, the art processes can include these steps:
Sample is pre-processed to remove unwanted materials and concentrate the cells.
(i.e.: Centrifugation, Filter Adhesion, etc. . . . )
Cells are deposited onto a charged microscope slide
Excess cells are rinsed from slide
Slide may be stored in an Alcohol solution until ready for staining
Slide is rinsed with Deionized Water to remove residual Alcohol
Slide is exposed to a nuclear stain
Aqueous based such as Hematoxylin
Slide is rinsed with Deionized Water to remove residual nuclear stain
Slide is rinsed with Alcohol to remove residual Deionized Water
Slide is exposed to a cytoplasmic stain
Alcohol based such as EA/OG
Slide is rinsed with Alcohol to remove residual cytoplasmic stain
Slide is rinsed with Clearing Agent to remove residual Alcohol
Clearing agent is usually Xylene or Xylene substitute
Mounting Media is added to slide
Cover-Slip is mounted to slide and Mounting Media
Mounting Media is allowed to dry adequately such that the Cover-Slip does not move
Slide is ready for cytological evaluation.

As noted above, if additional staining or alternate processing is required after the initial evaluation of the processed slide, the technician would either need to prepare another sample or remove the cover-slip and try and reprocess the original slide sample.

By preparing a subsequent sample, there is a chance that "rare event" cells may not be included in the new slide. Also, the arrangement of the cells on the new slide will be totally different from the original, thereby negating the ability to look at the very same cells of interest using X-Y coordinate location. If the cover-slip has to be removed from the original sample for reprocessing, it is possible that the sample material may be damaged or some of the critical "rare event" cells may be also removed. Even if morphology and "rare-event" cells are maintained, this is an arduous and time consuming task.

The methods described herein eliminates many if not all these issues while providing the following: Use of a single aqueous based stain to provide excellent nuclear detail and cytoplasm staining; Simultaneously staining of the sample while processing (One step sample preparation and staining); Adhesion of the stained sample cells onto a pre-coated slide (if employed); Temporary preservation of the sample morphology and staining without the need for a cover-slip to allow initial evaluation of the sample for "risk stratification" to determine if additional processing is required; Immediate transition to subsequent processing, such as the standard Papanicolaou stain. This process and component design could significantly reduce the initial staining and evaluation complexity currently required for cytological evaluations while providing rapid transition to alternate processing protocols from the same slide.

Procurement of the sample material from the subject for the cytological evaluation utilizes any methods known in the art. In conjunction with sample collection, samples may be exposed to other agents such as buffers, diluents, extraction or chromatographic media, cross-linking agents, blocking agents, denaturing agents, etc., to stabilize or otherwise prepare the sample for processing within a desired assay.

Once the sample has been prepared as described herein, any known method of analyses can be employed. Such methods include visual assessment with or without the aid of a magnifying device such as a microscope. A system for imaging a cytological sample including nuclear material and cytoplasmic material that includes an optical instrument and one or more light sources can be employed. Other equipment and techniques are known to those of skill in this field such as cytologists, technicians and pathologists, and can be used in combination with the compositions and methods disclosed herein.

In addition to the cytological staining compositions and methods of their use, the subject matter disclosed herein is directed to kits comprising the compositions, substrates, components, accessories, reagents and other related materials for practicing the sample preparation methods. These kits are clinically useful for preparing the sample to identify the presence or absence of an abnormal cell. The kits include an amount of cytological staining solution and may also include a polycationic coated substrate. The foregoing kit components are generally assembled in a collective packaging unit, which may include written or otherwise user-accessible instructions detailing the sample collection, handling and/or processing methods of the invention.

Kits for practicing the cytological preparation methods can include a suitable container or other device for collecting, storing, handling and/or processing a biological sample. A range of suitable collection devices is contemplated. For example, simple sterile containers or reservoirs are provided. A variety of solid phase devices, including microscopic glass slides, membranes, filters and like media, are provided to receive or partition selected liquid or solid fractions of the sample, or to receive or partition cells or cellular constituents from the sample. A wide variety of such sample collection devices are widely known or described in the literature, which can be readily adapted for use within specific embodiments.

The following examples are offered by way of illustration and not by way of limitation.

EXAMPLES

1. Preparation of Cytological Sample

Sample is pre-processed to remove unwanted materials and concentrate the cells (i.e.: Centrifugation, Filter Adhesion, etc.);
Cells are deposited onto a charged microscope slide;
Use Composition Stain to rinse excess cells from slide;
Incubate Composition Stain on slide (about 60 seconds);
Remove excess Composition Stain from slide;
Add a Liquid Cover Slip to slide (about 25 µl) and allowing it to spread over slide;
Slide is ready for cytological evaluation.
If additional staining or alternate processing is required after the initial evaluation of the processed slide, the technician simply has to rinse the slide in Deionized Water and proceed directly to the subsequent process. Cellular morphology and architecture of the sample will have been preserved.

2. Preparation of Cytological Sample in a One Step Process

Use Composition Stain to wash and concentrate cells;
Stained cells in Composition Stain are deposited onto a charged microscope slide;
Allow cells to settle on slide for about 4 minutes;
Remove excess Concept Stain from slide;
Add Concept Liquid Cover Slip or additional composition stain to slide (about 25 µl) and allowing it to spread over slide;
Slide is ready for cytological evaluation.
If additional staining or alternate processing is required after the initial evaluation of the processed slide, the technician simply has to rinse the slide in Deionized Water and proceed directly to the subsequent process. Cellular morphology and architecture of the sample will have been preserved.

3. Delineation of Cellular Architecture

FIG. 3 depicts abnormal cervical cells that were stained with the staining solution as described herein and subsequently immobilized onto a microscope slide having a polycationic charge coating. While the entirety of the cells and cell groups are readily visualized, the detail of the nucleus is extremely sharp in definition and can easily be distinguished for size, shape, and texture. FIG. 4 depicts the same cells on the same slide in FIG. 3 that were originally stained with the staining solution and subsequently restained with standard Papanicolaou stain. Note that while the cellular features are preserved, the nuclear detail is less defined and more difficult to ascertain. FIG. 5 depicts abnormal cervical cells that were stained with the staining solution as described herein and subsequently immobilized onto a microscope slide having a polycationic charge coating. While the entirety of the cells and cell groups are readily visualized, the detail of the nucleus is extremely sharp in definition and can easily be distinguished for size, shape, and texture. FIG. 6 depicts the same cells on the same slide in FIG. 3 that were originally stained with the staining solution and subsequently restained with standard Papanicolaou stain. Note that while the cellular features are preserved, the nuclear detail is less defined and more difficult to ascertain. FIG. 7 depicts abnormal cervical cells that were stained with the staining solution as described herein and subsequently immobilized onto a microscope slide having a polycationic charge coating. While the entirety of the cells and cell groups are readily visualized, the detail of the nucleus is extremely sharp in definition and can easily be distinguished for size, shape, and texture. FIG. 8 depicts the same cells on the same slide in FIG. 3 that were originally stained with the staining solution and subsequently restained with standard Papanicolaou stain. Note that while the cellular features are preserved, the nuclear detail is less defined and more difficult to ascertain.

As used herein, "about" means within a statistically meaningful range of a value such as a stated concentration range, time frame, molecular weight, volume, temperature or pH. Such a range can be within an order of magnitude, typically within 20%, more typically still within 10%, and even more typically within 5% of a given value or range. The allowable variation encompassed by "about" will depend upon the particular system under study, and can be readily appreciated by one of skill in the art.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

What is claimed is:

1. A composition for cytology staining, consisting of:
   i. Azure C;
   ii. one or more hygroscopic polyol(s), said polyol(s) present at less than 10% v/v of the total composition; optionally
   iii. a solvent, wherein the solvent is selected from the group consisting of water, a water-soluble solvent, a water-miscible solvent, and mixtures thereof.

2. The composition of claim 1, wherein Azure C is present in an amount of about 0.01 to about 0.0001% w/v.

3. The composition of claim 1, wherein Azure C is present in an amount of about 0.009 to about 0.001% w/v.

4. The composition of claim 1, wherein Azure C is present in an amount of about 0.003 to about 0.005% w/v.

5. The composition of claim 1, wherein said hygroscopic polyol is selected from the group consisting of glycerol, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, 2,2,4-trimethyl-1,3-pentanediol, butylene glycol, pentaerthyritol, mannitol, sorbitol, di-glycerol, tri-glycerol, tetra-glycerol, erythritol, 2-hydroxymethyl-2-methyl-1,3-propanediol (trimethylolethane), 2-ethyl-2-(hydroxymethyl)-1,3-propanediol (trimethylolpropane), and 1,2,4-hexanetriol and mixtures thereof.

6. The composition of claim 1, wherein said hygroscopic polyol is selected from the group consisting of glycerol and sorbitol.

7. The composition of claim 1, wherein said hygroscopic polyol is glycerol.

8. The composition of claim 1, wherein said hygroscopic polyol is present in an amount of less than 5% v/v.

9. The composition of claim 1, wherein said hygroscopic polyol is present in an amount from about 0.001 to about 5% v/v.

10. The composition of claim 1, wherein said hygroscopic polyol is present in an amount of about 3% v/v.

11. The composition of claim 1, wherein said solvent is a non-flammable, biocompatible solvent.

12. The composition of claim 1, wherein said solvent is a water-soluble solvent.

13. The composition of claim 1, wherein said composition contains a solvent and the solvent consists of water.

14. The composition of claim 1, wherein said solvent is selected from the group consisting of methanol, ethanol, n-propanol and isopropanol.

15. A composition for cytology staining, consisting of:
    i. a dye component consisting of Azure C;
    ii. glycerol, wherein said glycerol is present in an amount less than about 10% v/v of said composition; and optionally
    iii. water.

16. The composition of claim 15, wherein
    i. Azure C is present in an amount of about 0.004% w/v;
    ii. glycerol is present in an amount of about 3% v/v of said composition; and
    iii. water as a remaining portion of the composition.

17. A method of preparing a cytological preparation comprising:
    a. contacting a cell sample with a composition of claim 1.

18. The method of claim 17, wherein said cell sample is associated with a substrate.

19. The method of claim 18, wherein said substrate is selected from the group consisting of a microscope slide, a cuvette, a microtiter tray, a cell culture tray and a coverslip.

20. The method of claim 19, wherein when said substrate is a microscopic slide, the method does not comprise associating a solid cover slide with said sample associated with said substrate.

21. The method of claim 17, wherein said sample comprises cervical cells, abnormal cells, tumor cells, cells obtained in tissue aspiration, cells obtained in lavage collection or cells obtained in biopsy.

22. A method of characterizing a cytological sample comprising:
    a. contacting a cell sample with a composition of claim 1, wherein said sample is associated with a substrate, and
    b. subjecting said sample to an assay to determine the presence or absence of abnormal cells.

23. The method of claim 22, wherein said abnormal cells comprise a cancer cell.

24. The method of claim 23, wherein said cancer is selected from the group consisting of cervical, cancers of the reproductive system, brain, lung, liver, spleen, kidney, renal cell and renal pelvis cancers, lymph node, small intestine, pancreas, blood cells, bone, colon/colorectal, stomach, breast, endometrium, prostate, testicle, ovary, central nervous system, skin, head and neck, thyroid, para-thyroid, esophagus, bone marrow, hematological cancers, leukemia, acute promyelocytic leukemia, lymphoma, multiple myeloma, myelodysplasia and myeloproliferative disease.

25. The method of claim 24, wherein said cancer is cervical.

26. The composition of claim 1, wherein said hygroscopic polyol is present in an amount of 5% v/v.

27. The composition of claim 15, wherein Azure C is present in an amount of about 0.01 to about 0.0001% w/v.

28. The composition of claim 15, wherein Azure C is present in an amount of about 0.009 to about 0.001% w/v.

29. The composition of claim 15, wherein Azure C is present in an amount of about 0.003 to about 0.005% w/v.

30. The composition of claim 15, wherein glycerol is present in an amount of less than 5% v/v.

31. The composition of claim 15, wherein glycerol is present in an amount from about 0.001 to about 5% v/v.

32. The composition of claim 15, wherein glycerol is present in an amount of about 3% v/v.

\* \* \* \* \*